US012769614B2

(12) United States Patent

Dua et al.

(10) Patent No.: US 12,769,614 B2
(45) Date of Patent: Oct. 20, 2026

(54) METHOD AND APPARATUS FOR SAVING AND RESTORING ARCHITECTURE STATE INFORMATION OF PROCESSING ELEMENTS TO MEMORY DURING POWER STATE TRANSITIONS

(71) Applicant: QUALCOMM Incorporated, San Diego, CA (US)

(72) Inventors: Akshay Dua, San Jose, CA (US); Vinay Patel, Stouffville (CA); Jae Gon Lee, Mountain View, CA (US); Nitin Makhija, San Jose, CA (US); Mohsen Najafi Yazdi, Kingston (CA); Ayush Singh, San Jose, CA (US); Jihoon Jeong, Cary, NC (US); Sai Akshit Kumar Gampa, Austin, TX (US); Durga Ganesh Chimirala, Bangalore (IN); Vishal Srinivasan Iyer, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 18/757,998

(22) Filed: Jun. 28, 2024

(65) Prior Publication Data

US 2026/0003735 A1 Jan. 1, 2026

(51) Int. Cl.
*G06F 11/14* (2026.01)
*G06F 11/1471* (2026.01)

(52) U.S. Cl.
CPC ...... *G06F 11/1415* (2013.01); *G06F 11/1471* (2013.01); *G06F 2201/805* (2013.01)

(58) Field of Classification Search
CPC .. G06F 11/1415; G06F 11/1402; G06F 11/14; G06F 11/1471
See application file for complete search history.

(56) References Cited

U.S. PATENT DOCUMENTS

| | | | | |
|---|---|---|---|---|
| 5,297,282 | A | 3/1994 | Meilak et al. | |
| 5,710,930 | A * | 1/1998 | Laney .................. | G06F 9/4418 710/10 |
| 7,962,771 | B2 | 6/2011 | Song et al. | |
| 7,996,663 | B2 | 8/2011 | Stillwell, Jr. et al. | |
| 9,262,322 | B2 | 2/2016 | Walker | |
| 9,424,138 | B2 | 8/2016 | Swarna et al. | |

(Continued)

FOREIGN PATENT DOCUMENTS

CN 110573991 A 12/2019

OTHER PUBLICATIONS

International Search Report and Written Opinion PCT/US2025/028861 ISA/EPO Oct. 1, 2025.

*Primary Examiner* — Raymond N Phan
(74) *Attorney, Agent, or Firm* — Patterson + Sheridan LLP

(57) ABSTRACT

Certain aspects of the present disclosure provide techniques for hardware-based saving and restoring of architecture state information for processing elements (PEs). According to certain aspects, one or more circuit elements trigger saving of architecture state information of at least one PE to at least one memory prior to the at least one PE transitioning from a first state to a second state and triggering restoration of the architecture state information from the at least one memory to the at least one PE prior to the at least one PE transitioning from the second state to the first state.

14 Claims, 13 Drawing Sheets

(56) References Cited

U.S. PATENT DOCUMENTS

| | | | | |
|---|---|---|---|---|
| 9,830,257 | B1 * | 11/2017 | Booth | G11C 14/0018 |
| 9,891,687 | B2 | 2/2018 | Park | |
| 10,977,018 | B1 | 4/2021 | Hwang et al. | |
| 11,074,207 | B1 | 7/2021 | Kim et al. | |
| 11,586,472 | B2 | 2/2023 | Branover et al. | |
| 11,921,564 | B2 | 3/2024 | Tanna | |
| 12,153,485 | B2 | 11/2024 | Shek et al. | |
| 12,373,623 | B2 | 7/2025 | Eavy et al. | |
| 2004/0153762 | A1 | 8/2004 | Flynn et al. | |
| 2006/0149940 | A1 * | 7/2006 | Mukherjee | G06F 9/461 712/228 |
| 2012/0254526 | A1 | 10/2012 | Kalyanasundharam | |
| 2014/0108734 | A1 | 4/2014 | Kitchin et al. | |
| 2015/0095614 | A1 | 4/2015 | Toll et al. | |
| 2015/0178091 | A1 | 6/2015 | Offen et al. | |
| 2016/0321183 | A1 | 11/2016 | Govindan et al. | |
| 2016/0378660 | A1 | 12/2016 | Gendler et al. | |
| 2017/0052579 | A1 | 2/2017 | Abraham et al. | |
| 2018/0039580 | A1 | 2/2018 | Schneider | |
| 2018/0329818 | A1 * | 11/2018 | Cheng | G06F 11/1438 |
| 2020/0310527 | A1 | 10/2020 | Gendler et al. | |
| 2021/0240248 | A1 | 8/2021 | Zaretsky et al. | |
| 2022/0043653 | A1 | 2/2022 | Acharya et al. | |
| 2022/0116457 | A1 | 4/2022 | Pak et al. | |
| 2023/0376218 | A1 * | 11/2023 | Garcia Redondo | G06F 3/0673 |
| 2026/0003736 | A1 | 1/2026 | Dua et al. | |
| 2026/0003737 | A1 | 1/2026 | Dua et al. | |
| 2026/0003738 | A1 | 1/2026 | Dua et al. | |

* cited by examiner

- * refers to where x can be any number
- ** refers to where n can be any number

METHOD AND APPARATUS FOR SAVING AND RESTORING ARCHITECTURE STATE INFORMATION OF PROCESSING ELEMENTS TO MEMORY DURING POWER STATE TRANSITIONS

FIELD OF THE DISCLOSURE

Aspects of the present disclosure relate to wireless communications, and more particularly, to techniques for saving processing element architecture state information.

DESCRIPTION OF RELATED ART

Machine learning is generally the process of producing a trained model (e.g., an artificial neural network, a tree, or other structures), which represents a generalized fit to a set of training data. Applying the trained model to input data produces inferences, which may be used to gain insights into the input data. In some cases, applying the model to the input data is described as "running an inference" or "performing an inference" on the input data.

To train a model and perform inferences on input data, various mathematical operations are performed using various mathematical processing components. For example, multiply-and-accumulate (MAC) units may be used to perform these operations to train a model and perform inferences on input data using the trained model. It should be noted, however, that MAC units may be used for various mathematical operations and are not so limited to use in mathematical operations related to training a model and performing inferences on input data. These mathematical operations may be performed on various types of numerical data with varying complexity. Generally, the complexity of these operations may scale with the bit size of the data and the type of the data. For example, operations using 8-bit integers may be less computationally complex than performing an inference using larger sized integers, such as 64-bit integers. Similarly, operations using a given bit size of integers may be less computationally complex than operations using the given bit size of floating point numbers (e.g., operations performed using 32-bit integers may be less computationally complex than operations using 32-bit floating point numbers, even though the data is the same size in bits).

Power utilization, thermal output, and processing time generally scale with computational complexity. That is, less computationally complex operations generally consume less power and are completed more quickly than more computationally complex operations. Consequently, the execution of more computationally complex operations may result in reduced battery life and delays in the ability to reassign computing resources (e.g., compute cores on a processor, memory, etc.) to other tasks executing on a device.

SUMMARY

One aspect provides a method. The method includes triggering, via one or more circuit elements, saving of architecture state information of at least one processing element (PE) to at least one memory prior to the at least one PE transitioning from a first state to a second state; and triggering, via the one or more circuit elements, restoration of the architecture state information from the at least one memory to the at least one PE prior to the at least one PE transitioning from the second state to the first state.

Other aspects provide: an apparatus operable, configured, or otherwise adapted to perform any one or more of the aforementioned methods and/or those described elsewhere herein; a non-transitory, computer-readable media comprising instructions that, when executed (e.g., directly, indirectly, after pre-processing, without pre-processing) by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
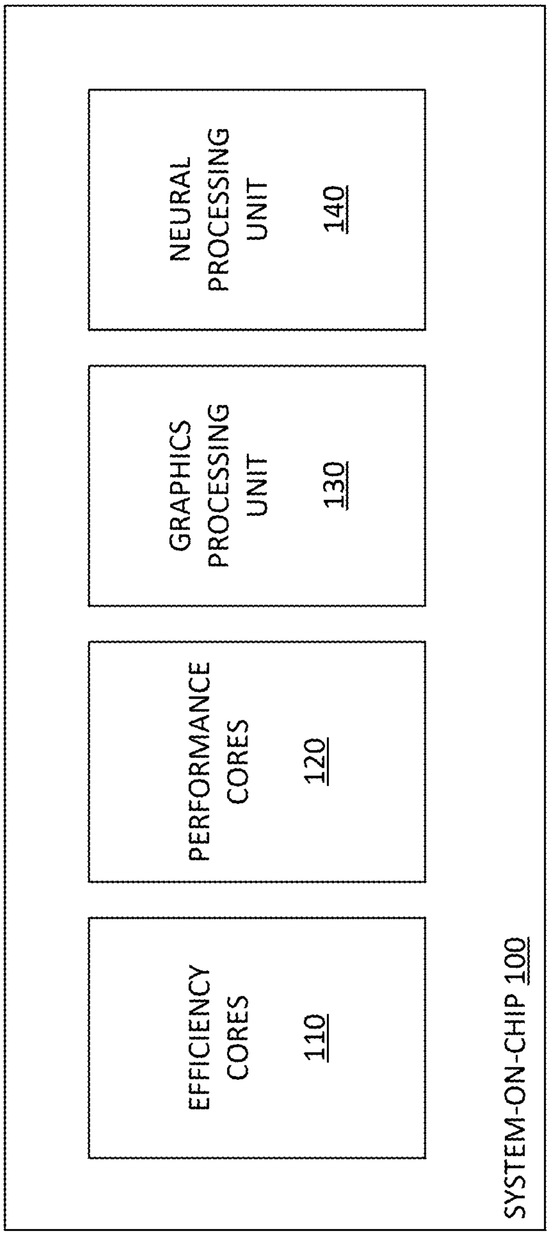
FIG. 1 depicts an example system-on-chip (SoC).

Certain aspects of the present disclosure provide techniques for hardware-based saving and restoring of architecture state information for processing elements (PEs).

A computer architecture is typically defined by its instruction set and architecture state. For example, an architecture state may include a program counter and various registers that include other state information. Based on a current architecture state, a PE executes a particular instruction with a particular set of data, resulting in a new architecture state. Thus, the architecture state includes information that defines what a computer is doing. If this information is saved prior to a power down, after powering back up this information may be restored and allow a PE to resume operation.

For this reason, in order to retain the architecture state of a PE, the saving of architecture state information may be initiated before a PE starts a power down sequence. Architecture state restoration may be initiated as a part of power up sequence, before the PE is allowed to fetch instructions. This saving and restoration of architecture state information allows PEs to resume operations from where they left off before a reset, such as a power-cycle, of the PEs occurred.

Architecture state save and restore procedures allow a PE to skip unnecessary initialization required during boot time. For example, because of an architecture restore, a PE can retain history of next address from which instruction was supposed to be fetched, instead of starting from a base address. Without saving PE architecture state, resetting and switching off the PE is an expensive task, which could lead to some PEs not switching off even when in an IDLE state, hence increasing power consumption. Saving architecture state information, on the other hand, allows a PE to power gate (reduce or remove power to the PE), hence saving power consumption.

To implement architecture state, save and restore, conventional solutions typically focus on software (SW) intervention or focus on using circuits referred to as retention flops for the architecture state registers.

For SW-based solutions, software typically intervenes and saves the architecture state before PE can be in reset state. Subsequently, before the PE is allowed to perform any task, software restores the architecture state. Unfortunately, the SW-based solution results in a relatively high latency for the PE powering up and powering down, as software access to the hardware registers (for the architecture state information) is relatively slow and requires many cycles. High latency of PE powering down also has an impact on power usage, because PE cannot be power gated until the architecture save is complete. High latency of PE powering up also impacts the performance, since the PE cannot start performing any task until the architecture state restoration is complete.

When implementing retention flop-based architecture state saving, each register that requires preservation will utilize retention-based flops. Unfortunately, as the number of registers requiring saving grows, the count of retention flops will also increase. Consequently, circuit area will rise, given that retention flops occupy more space than standard flops. Retention flops generally require higher voltage as compared to standard flops. Further, because retention flops typically require dual power supplies, power consumption rises proportionally with the number of architecture state registers that must be preserved.

Aspects of the present disclosure provide hardware-based architecture state save and restore procedures as an alternative to conventional SW-based or retention flop-based architectural state save and restore procedures.

In comparison to the SW-based architecture state save and restore procedures, the hardware-based solution proposed herein may have a direct positive impact on (reducing) time spent on saving and restoring. Consequently, it also improves the power consumption by PEs and reduces the power-up latency, ultimately leading to improved battery life. Further, when compared to the retention flop-based solution, the hardware-based solution proposed herein may also result in less area and consume less power for achieving architecture state saving and restoration.

Introduction to System-on-Chip (SoC)

FIG. 1 illustrates an example system-on-chip (SoC) 100 on which artificial intelligence workloads can be processed, according to aspects of the present disclosure.

As illustrated, the SoC 100 includes one or more efficiency cores 110, one or more performance cores 120, a graphics processing unit (GPU) 130, and a neural processing unit (NPU) 140, amongst other processing units and components (not illustrated) on which various compute workloads can be processed (e.g., tensor processing units, application-specific integrated circuits (ASICs), digital signal processors (DSPs), and the like). The efficiency cores 110 and the performance cores 120, in some aspects, may be processors implementing a same processing architecture (e.g., processors implementing the ARM or RISC-V architectures). Generally, the efficiency cores 110 may have lower performance (e.g., as measured by a number of operations per second that the efficiency cores 110 can perform) than the performance cores 120, but may use less power than the performance cores 120 in executing a workload. The SoC 100 may include any number of efficiency cores 110 and any number of performance cores 120. The GPU 130 may be a specialized processing unit which is configured to perform large mathematical operations (e.g., matrix, vector, tensor, etc. operations) in parallel.

The NPU 140, is generally a specialized circuit configured for implementing control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing unit (TPU), neural network processor (NNP), intelligence processing unit (IPU), vision processing unit (VPU), or graph processing unit.

The NPU 140 may be configured to accelerate the performance of common machine learning tasks, such as image classification, machine translation, object detection, and various other predictive models. In some examples, a plurality of NPUs may be instantiated on a single chip, such as a system on a chip (SoC), while in other examples such NPUs may be part of a dedicated neural-network accelerator.

NPUs, such as the NPU 140, may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this new piece through an already trained model to generate a model output (e.g., an inference).

Each of the processing units on the SoC 100 (e.g., the efficiency cores 110, the performance cores 120, the GPU 130, the NPU 140, and/or other processing units not illustrated in FIG. 1) generally have different performance characteristics. These performance characteristics may include power slope, leakage power, dynamic clock and voltage scaling points (e.g., points at which processing core clock speed and voltage draw scales upward or downward), instructions-per-clock cycle (IPC) performance levels, and the like.

Workloads executing on the SoC 100 may also be defined by various characteristics which may influence how these workloads, or portions thereof, are scheduled for execution on various processing units of the SoC 100. For example, the workloads may be characterized by a number of stages (e.g., layers) in an artificial intelligence model executing on the SoC 100, a length of an input into the artificial intelligence model, data types associated with each stage or layer of the artificial intelligence model.

Generally, artificial intelligence workloads, or portions thereof, may have various performance characteristics which may, in conjunction with system-level operating thresholds such as an amount of available power from which the SoC 100 can draw, thermal thresholds, and the like, influence the scheduling of these workloads on the various processing units (e.g., the efficiency cores 110, the performance cores 120, the GPU 130, the NPU 140, and/or other processing units not illustrated in FIG. 1). For example, when executing inferencing operations on the SoC 100 using a large language model that is trained to generate tokens (e.g., words or parts of words) in response to an input prompt, a CPU (e.g., the efficiency cores 110 and/or performance cores 120) may spend more time generating a response than the GPU 130 or the NPU 140. Because the CPU may spend a significant amount of time generating the response, the amount of power which can be drawn by the CPU in order to generate a response may actually be greater than the amount of power used by the GPU 130 or the NPU 140 to perform the same operation, as while the GPU 130 and the NPU 140 may have higher power draw characteristics, the GPU and the NPU 130 may spend less time executing an operation.

Aspects Related to Hardware-Based Architecture State Save and Restore

Certain aspects of the present disclosure provide techniques for hardware-based saving and restoring of architecture state information for processing elements (PEs).

In order to retain the architecture state of a PE, the saving of architecture state information (from architecture state registers) may be initiated before a PE starts a power down sequence. Architecture state restoration may be initiated as a part of power up sequence, before the PE is allowed to fetch instructions. This saving and restoration of architecture state information allows PEs to resume operations from where they left off before a reset, such as a power-cycle, of the PEs occurred.

Figure 2:
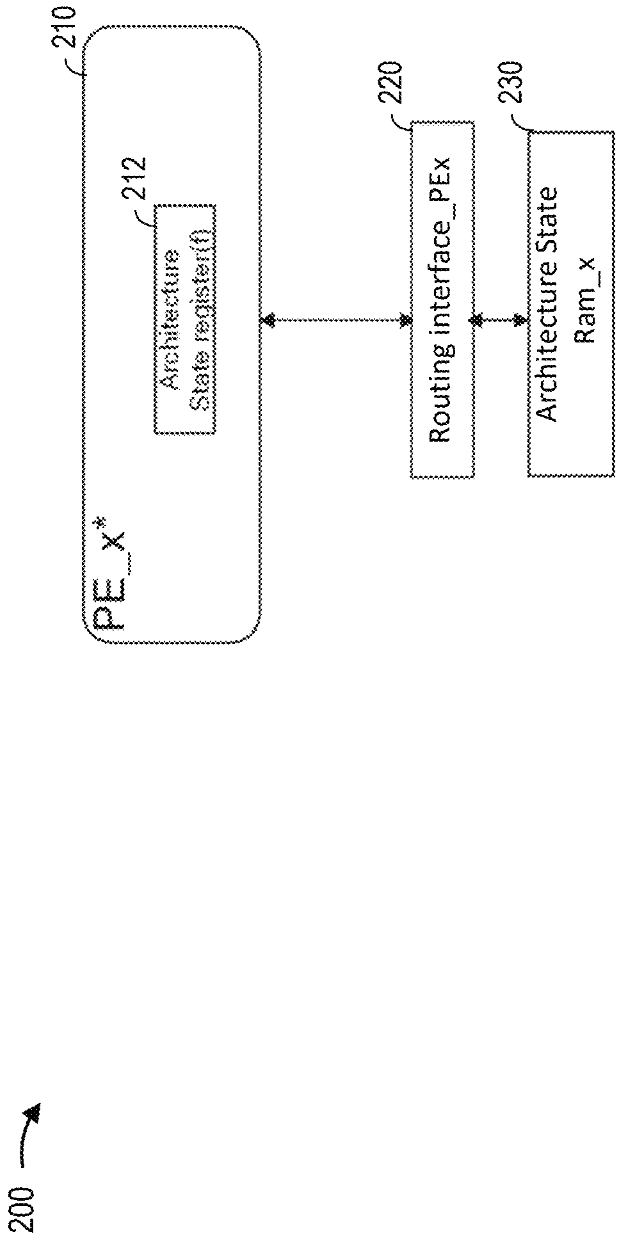
FIG. 2 depicts an example of saving processor element architecture state information.

FIG. 2 depicts an example 200 of saving processor element architecture state information. In the illustrated example, architecture state information for a processing element (PE) 210 is contained in architecture state registers 212. For example, an architecture state save procedure may be initiated before PE 210 and/or other PEs start a power down sequence in order to retain their architecture state.

As illustrated, routing interface 220 may access the architecture state information from the architecture state registers 212 of PE 210 and store the information in architecture state RAM 230. Architecture state RAM 230 may be any type of memory suitable to retain the architecture state information (e.g., while the PE 210 is in a reset/powered down state) until restoration of the architecture state information in preparation of PE 210 resuming operation.

An architecture restore may subsequently be initiated (e.g., as a part of power up sequence) before the PE is allowed to fetch instructions. For restoration, routing interface 220 may access the architecture state RAM 230 and restore the information to the architecture state registers 212. This architecture state restoration procedure may enable the PEs to resume operations from where the left off before the reset (e.g., power-down) of the PEs.

In this manner, architecture state save and restore procedures may allow a PE to skip unnecessary initialization required during boot time. For example, because of an architecture restore, a PE can retain history of next address from which instruction was supposed to be fetched, instead of starting from a base address. Without saving PE architecture state, resetting and switching off the PE is an expensive task, which could lead to some PEs not switching off even when in an IDLE state, hence increasing power consumption. Saving architecture state information, on the other hand, allows a PE to power gate (reduce or remove power to the PE), hence saving power consumption.

As noted above, to implement architecture state, save and restore, conventional solutions typically focus on software (SW) intervention or focus on using circuits referred to as retention flops for the architecture state registers. SW-based solutions may result in a relatively high latency for the PE powering up and powering down, as software access to the hardware registers (for the architecture state information) is relatively slow and requires many cycles. When implementing retention flop-based architecture state saving, each register that requires preservation will utilize retention-based flops. Unfortunately, as the number of registers requiring saving grows, the count of retention flops will also increase resulting in increased real estate and power consumption.

Aspects of the present disclosure provide hardware-based architecture state save and restore procedures as an alternative to conventional SW-based or retention flop-based architectural state save and restore procedures.

In comparison to the SW-based architecture state save/restore procedures, the hardware-based solution proposed herein may have a direct positive impact on (reducing) time spent on saving and restoring. When compared to the retention flop-based solution, the hardware-based solution proposed herein may also result in less area and consume less power for achieving architecture state saving and restoration.

Figure 3:
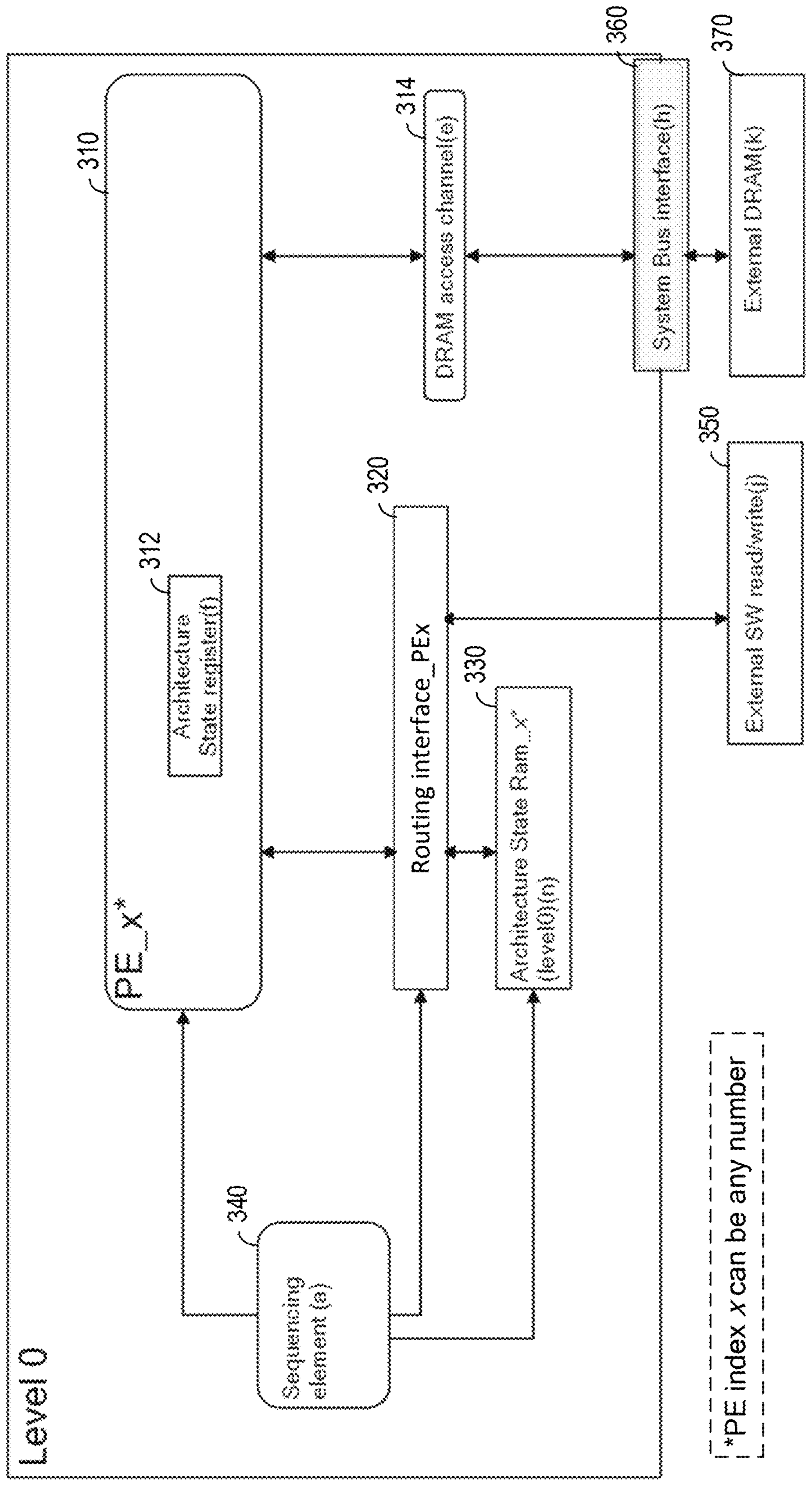
FIG. 3 depicts an example architecture capable of saving processor element architecture state information, in accordance with aspects of the present disclosure.

FIG. 3 depicts an example architecture 300 capable of saving processor element (PE) architecture state information, in accordance with aspects of the present disclosure.

As illustrated, the example architecture 300 includes at least one circuit element, labeled as sequencing element 340, configured to trigger architecture state save and restore procedures for one or more PEs 310, for example, as a part of power up and power down sequence. These save and restore procedures may be considered hardware-based because the sequencing element 340 and routing interface 320 may be able to trigger and initiate architecture state storing and restoration without lengthy software-based reads and writes.

As illustrated, the architecture may also implement a DRAM access channel 314 to access external DRAM 370 via a system bus interface 360. Using a different channel for DRAM access and architecture state save/restore may allow the architecture state save/restore to happen in parallel with DRAM accesses, hence not impacting PE performance.

In the illustrated example, the sequencing element 340 may interact with a routing interface 320 to access the architecture state information from architecture state registers 312 of PE 310 and store the information in architecture state RAM 330. The routing interface 320 may also control access to architecture state information via external software read/writes 350.

As will be described in greater detail below, depending on a particular embodiment, there could be a sequencing element 340 per PE or a single sequencing element 340 could control architecture state save/restore across multiple PEs.

Figure 4:
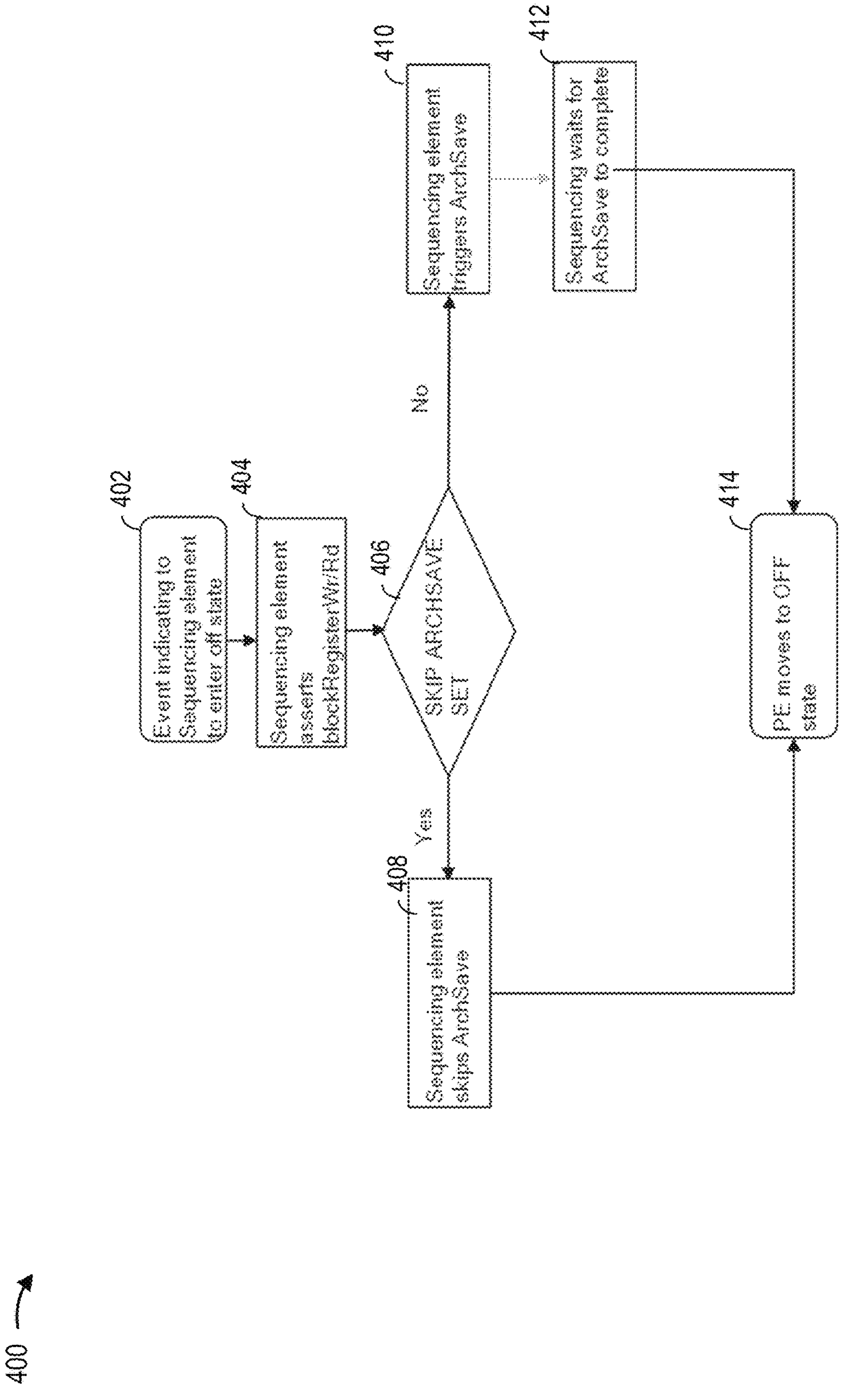
FIG. 4 depicts an example flow diagram of operations for saving processor element architecture state information, in accordance with aspects of the present disclosure.
Figure 5:
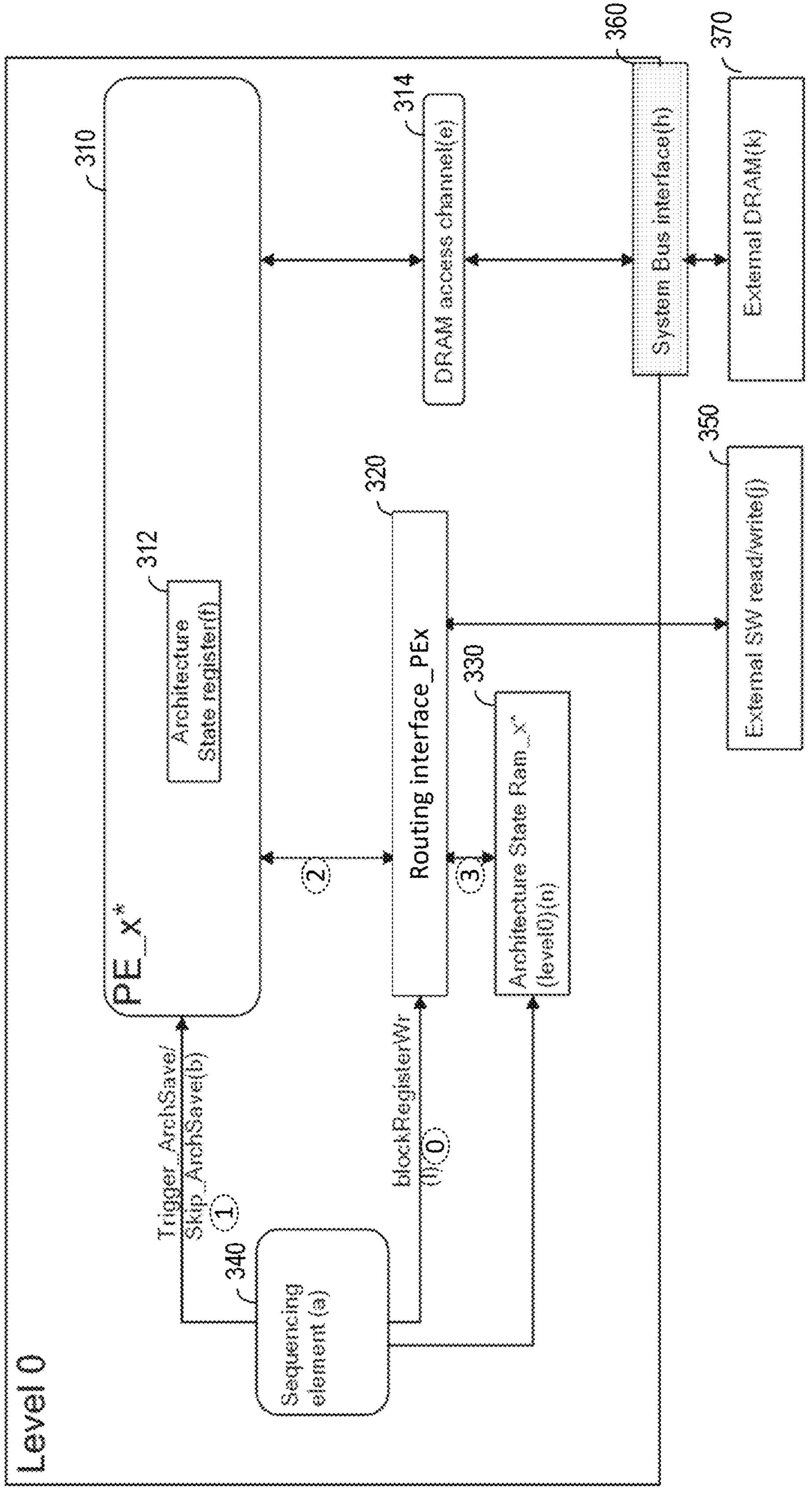
FIG. 5 depicts an example sequence of operations for saving processor element architecture state information, in accordance with aspects of the present disclosure.

How the various components of a hardware-based architecture state save procedure interact may be understood with concurrent reference to the example flow diagram 400 of FIG. 4 and block diagram FIG. 5, which illustrate a sequence of operations for saving PE architecture state information, in accordance with aspects of the present disclosure.

As illustrated at 402, an event may occur that indicates, to the sequencing element that the PE should enter the off state. This may be, for example, a power down, reboot, or other type of event.

As illustrated at 404, in preparation of performing the architecture state save procedure, the sequencing element may assert a signal to block (external) register write and reads of architecture state registers.

As labeled as step (0) in FIG. 5, the sequencing element 340 may assert a signal to the routing interface 320 to block access to architecture state registers from external software read/write 350. This signal may be designed to help avoid overwrite of the architecture state during power down, by ensuring that external access to architecture state information is blocked.

As indicated at 406, in some cases, a PE (or corresponding sequencing element) may be configured to skip the architecture state save procedure. For example, for some PEs, if architecture state save is not required solutions proposed herein may support the configurability to not save/restore and to skip architecture save/restoring, as indicated at 408.

As indicated at 410, if not configured to skip, the sequencing element may trigger the architecture save procedure. As labeled as step (1) in FIG. 5, the sequencing element 340 may assert the signal (to routing interface 320) to block access to architecture state registers from external software read/write 350.

As indicated at 412, the sequencing element may wait for the architecture state save procedure to complete. As shown in FIG. 5, this may include waiting for routing interface 320 to read information from architecture state registers architecture state registers 312, labeled as step (2), and to store the information in architecture state RAM 330, labeled as step (3).

After completion of the architecture state save procedure, the PE may move to the OFF state, as indicated at 414.

Figure 6:
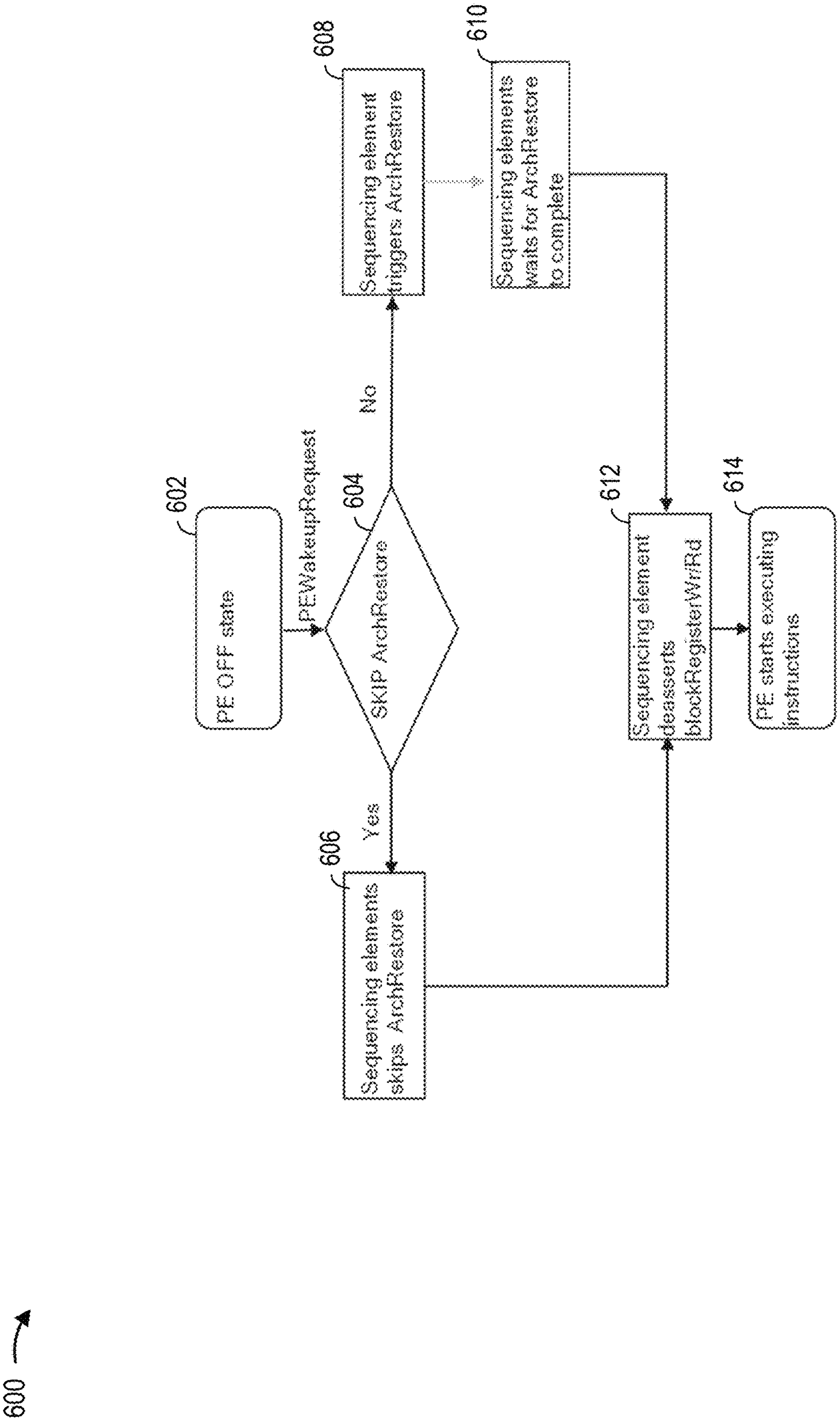
FIG. 6 depicts an example flow diagram of operations for restoring processor element architecture state information, in accordance with aspects of the present disclosure.
Figure 7:
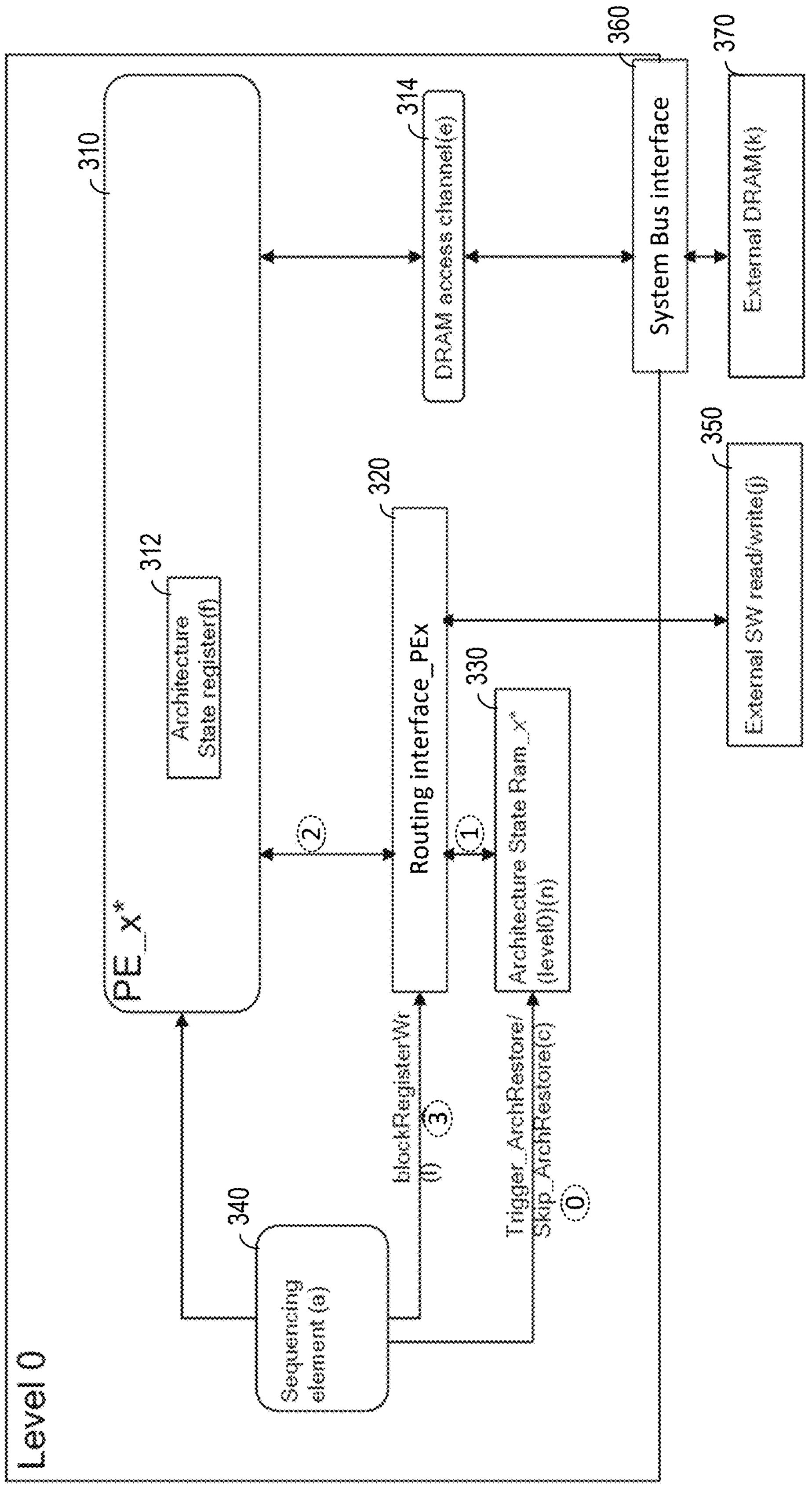
FIG. 7 depicts an example sequence of operations for restoring processor element architecture state information, in accordance with aspects of the present disclosure.

How the various components of a hardware-based architecture state save procedure interact may be understood with concurrent reference to the example flow diagram 600 of FIG. 6 and block diagram FIG. 7, which illustrate a sequence of operations for restoring PE architecture state information, in accordance with aspects of the present disclosure.

As illustrated at 602, with the PE in the OFF state, the PE may receive a PE wakeup request.

As noted above, in some cases, a PE (or corresponding sequencing element) may be configured to skip the architecture state restore procedure. If the PE is so configured, as determined at 604, the sequencing element may skip the restoration procedure, as indicated at 606.

As indicated at 608, if not configured to skip, the sequencing element may trigger the architecture restore procedure. Sequencing element triggering the architecture state restoration procedure is labeled as step (0) in FIG. 7.

As indicated at 610, the sequencing element may wait for the architecture state save restoration procedure to complete. As shown in FIG. 7, this may include waiting for routing interface 320 to read information from architecture state RAM 330, labeled as step (1), and to store the information back in the architecture state registers 312, labeled as step (2).

As indicated at 612, and as labeled as step (3) in FIG. 7, the sequencing element may de-assert the signal (to routing interface 320) to again allow access to architecture state registers from external software read/write 350. As indicated at 614, with the architecture state information restored, the PE may now start executing instructions.

In this manner, aspects of the present disclosure provide a sequencing element that may trigger an architecture save procedure and an architecture restore procedure (e.g., as a part of power up and power down sequence).

As noted above, according to certain aspects, a sequencing element may be provided for each PE ("per PE"). As an alternative (or in addition), a single sequencing element may be provided and configured to control architecture state save and restoration procedures across multiple PEs.

For different PEs, architecture state save and restoration procedures may have a dedicated routing interface 320. One potential advantage to having dedicated routing interfaces is that, during ongoing architecture state save/restore for one PE, access to other PEs may remain unaffected. Furthermore, the performance of other PEs may not be impacted while save/restore for one PE is in progress. This design may also enable simultaneous save/restore procedures for multiple PE.

Referring back to FIG. 3, a different channel may be used for architecture state save/restore procedures than a channel 314 used for DRAM access. Use of separate channels in this manner may allow architecture state save/restore procedures to happen in parallel to accesses to DRAM 370, hence not impacting PE performance.

In some cases, due to certain hardware limitations, there may also be a concern in allowing access to all the PE registers at once. According to certain aspects, to address this concern, a sequencing element may keep track of the registers that need to be saved and restored. Within a PE, access to such registers may be either sequential or spread across (e.g., via parallel access).

Given that a dedicated routing interface can enhance performance but comes with an area cost, certain aspects of the present disclosure may allow routing interface sharing. Sharing can occur either between one PE and DRAM access or among different PEs that share the same architecture routing resources. Further, as noted above, therefore, if architecture state save is not required, aspects of the present disclosure support the configurability to not perform (to skip) architecture save/restore procedures.

FIGS. 8-11 depict various example architectures capable of saving processor element architecture state information, in accordance with various aspects of the present disclosure.

Figure 8:
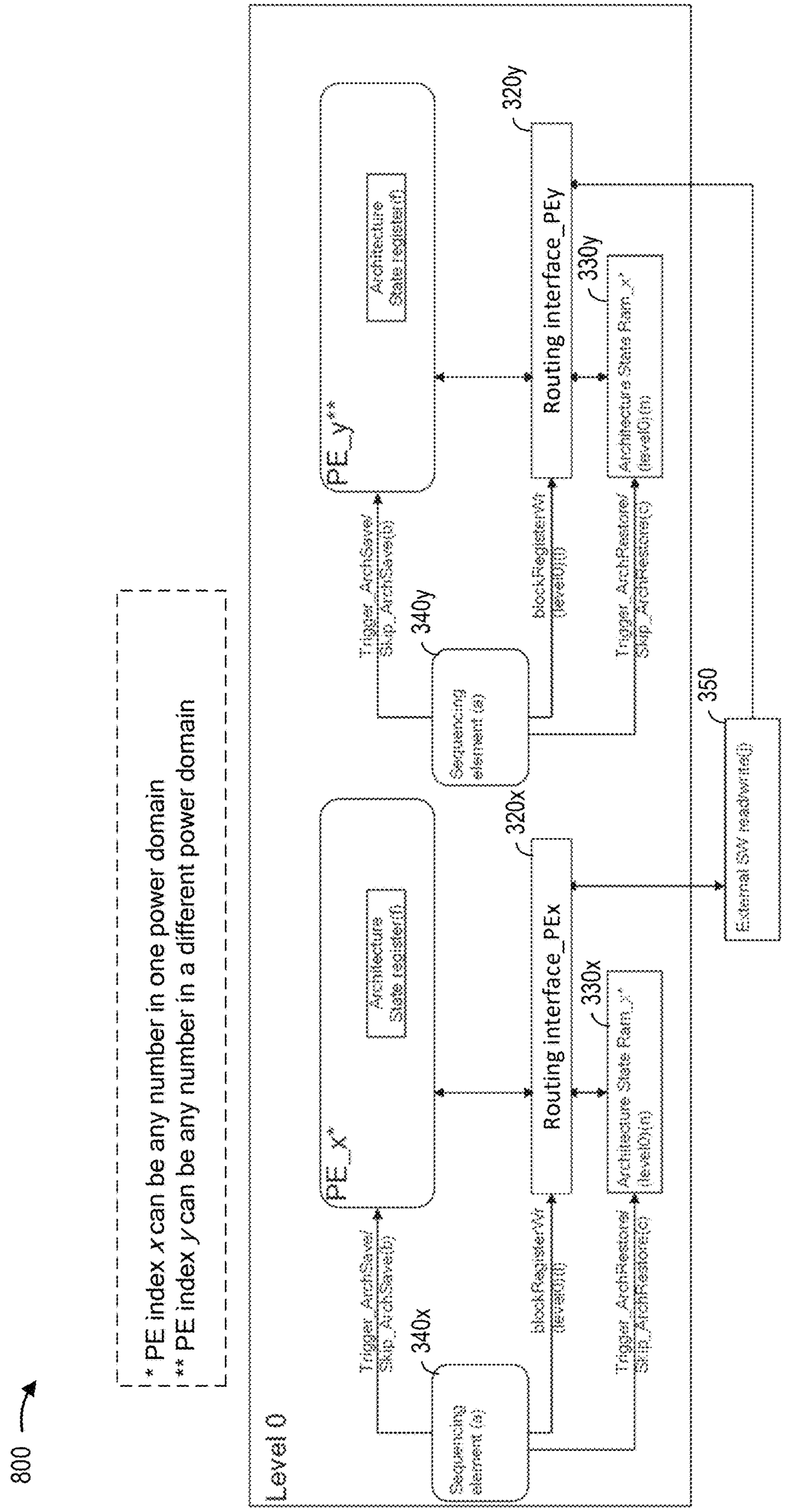
FIGS. 8-11 depict various example architectures capable of saving processor element architecture state information, in accordance with aspects of the present disclosure.

Referring first to FIG. 8, an example architecture 800 includes a separate sequencing element per PE. In the illustrated example, a first sequencing element 340*x* is provided for a first PE (PE_x), while a second sequencing element 340*y* is provided for a first PE (PE_y). In some cases, PE_x and PE_y may be in different power domains. While external DRAM access is not illustrated, each PE (PE_x and PE_y) may have its own DRAM access channel (e.g., as shown in FIG. 3) or the different PEs may share a DRAM access channel.

Figure 9:
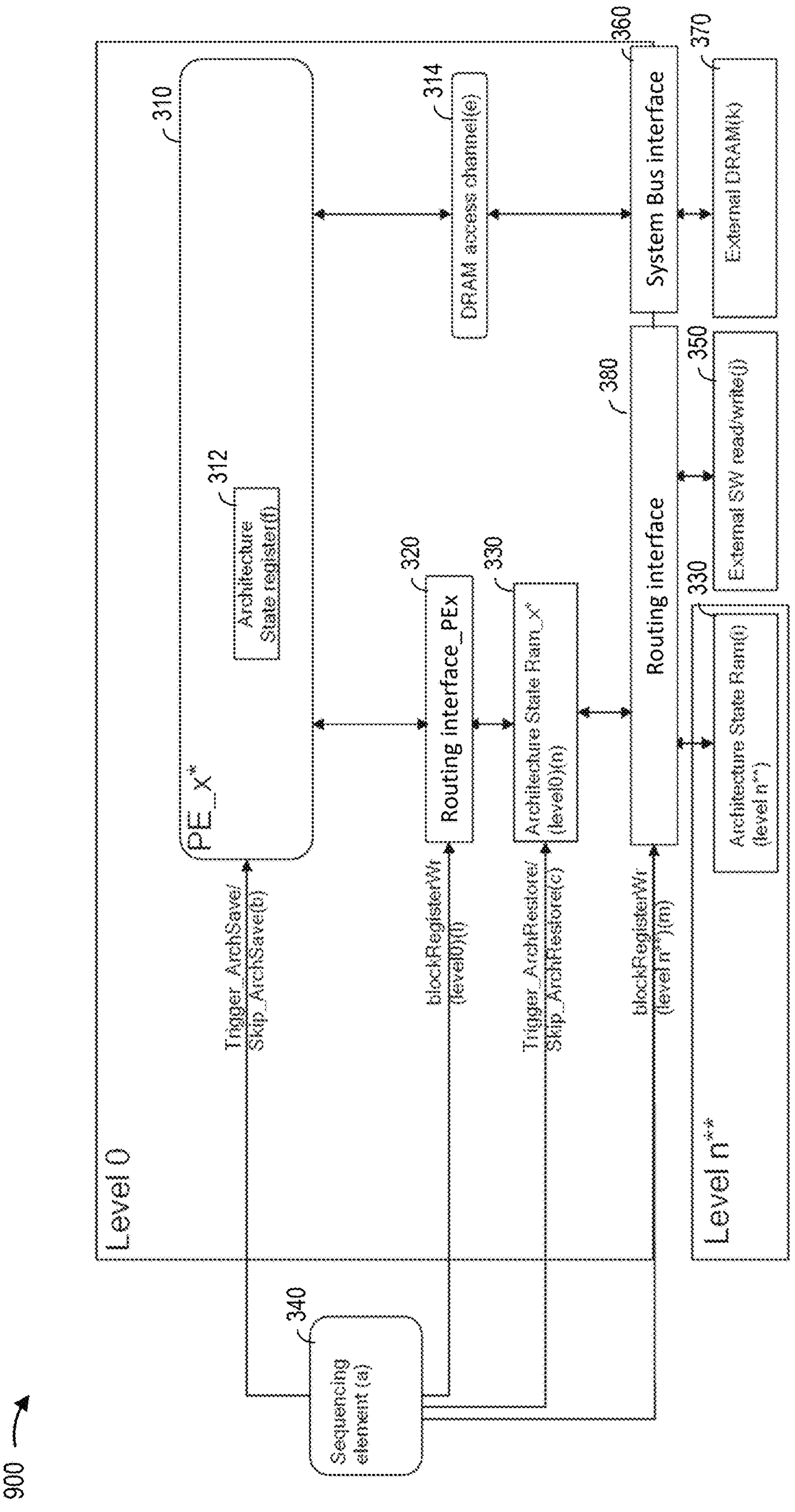

Referring next to FIG. 9, an example architecture 900 provides a solution that supports a multi-hierarchy of architecture state save and restore procedures, where state information is saved in multiple memories. This approach may enable multiple opportunities for architecture save and restore procedures across different power domains.

In the illustrated example, sequencing element 340 is independent of the (architecture/logical) level where the architecture state save and restoration happens. Additionally, the number of sequencing elements may be different. In some cases, sequencing elements may be provided per level of hierarchy where architecture save and restoration is happening. In other cases, a single sequencing element may control architecture save and restoration across multiple hierarchical levels (e.g., across the entire hierarchy).

Figure 10:
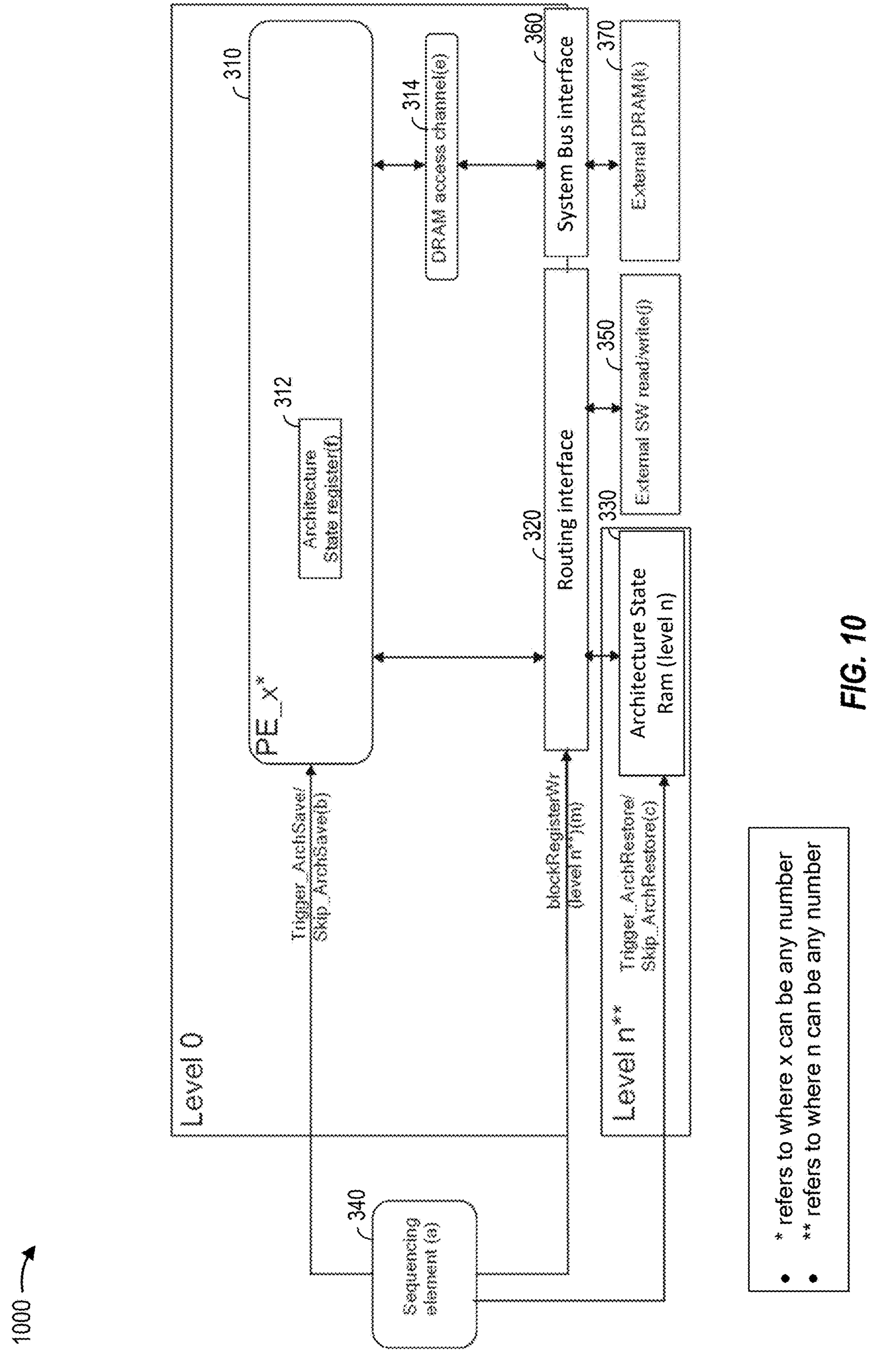

Referring next to FIG. 10, an example architecture 1000 provides a solution that allows architecture state save and restoration from any hierarchical level where architecture state RAM 330 exists. For example, architecture state information at level 0 may be directly saved at level 2, without saving at level 0 and/or level 1. Similarly, architecture state information may be restored from level 2 to level 0. Aspects of the present disclosure, thus, provide solutions that may be considered independent of any level of hierarchy existing in a given design.

As noted above, in some cases, once PEs are in a reset state, sequencing element(s) and/or the routing interface(s) may be configured to ensure no external source cannot request the PE for the architectural state.

Figure 11:
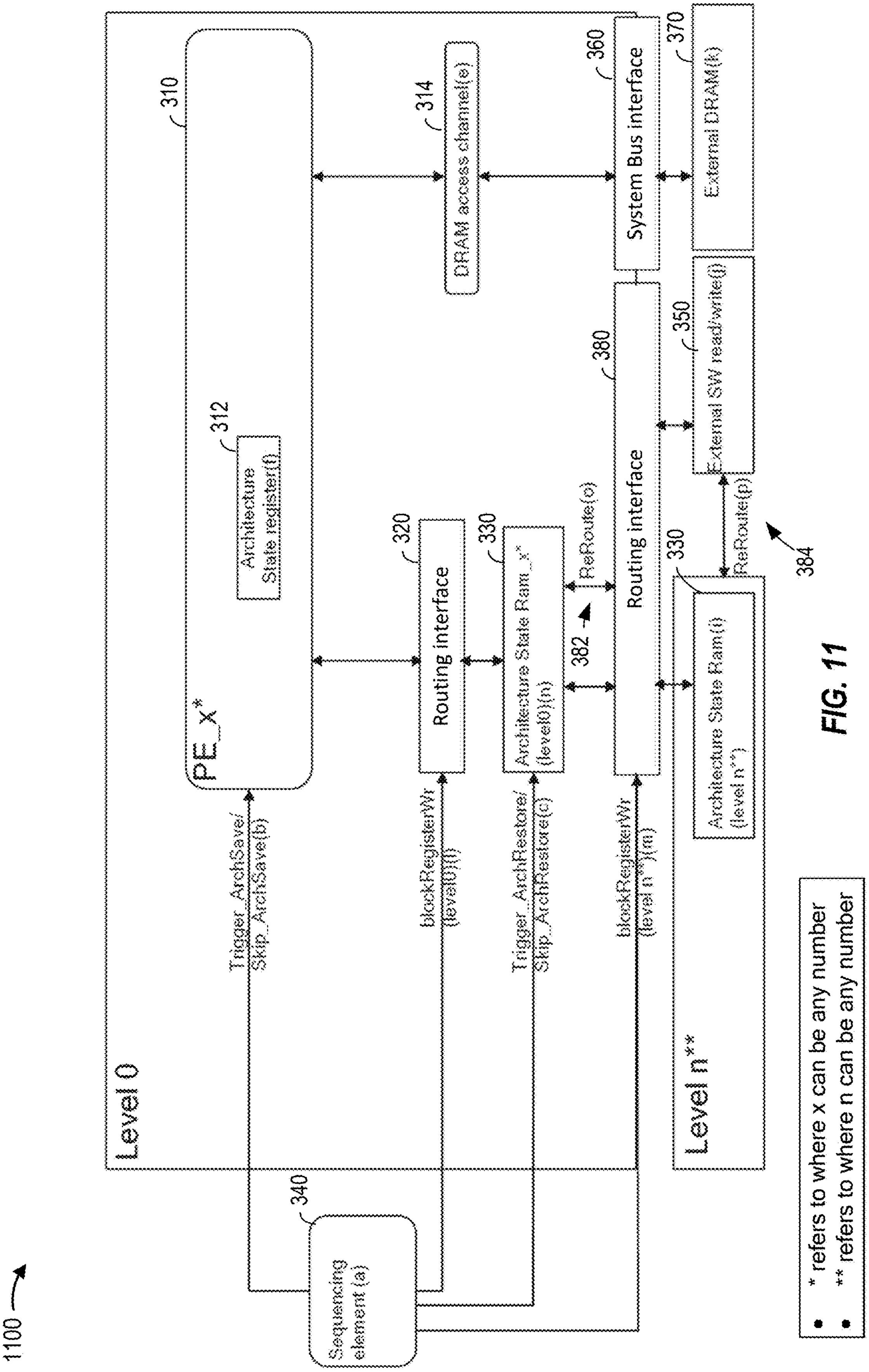

As illustrated in example 1100 of FIG. 11, according to certain aspects, such requests to access PE architecture state may be re-routed to the architectural state RAM. In the illustrated example, a separate routing interface 380 may be provided (in addition to routing interface 320) configured to re-route architecture state requests to architecture state RAM 330, as indicated at 382. As further illustrated in FIG. 11, rerouting may also be achieved at a multi-hierarchy level, for example, where an external source 350 can (directly) access architectural state ram 330 at a given level (e.g., level 0, or at level n), as indicated at 384.

As described herein, when compared to SW-based architecture state save and restoration procedures, the hardware-based solution proposed herein may have a direct positive impact on (reducing) time spent on saving and restoring. Consequently, the mechanisms proposed herein may also improve power consumption by PEs and reduce power-up latency, ultimately leading to improved battery life. Further, when compared to the retention flop-based solution, the hardware-based solution proposed herein may also result in less area and consume less power for achieving architecture state saving and restoration.

Example Operations

Figure 12:
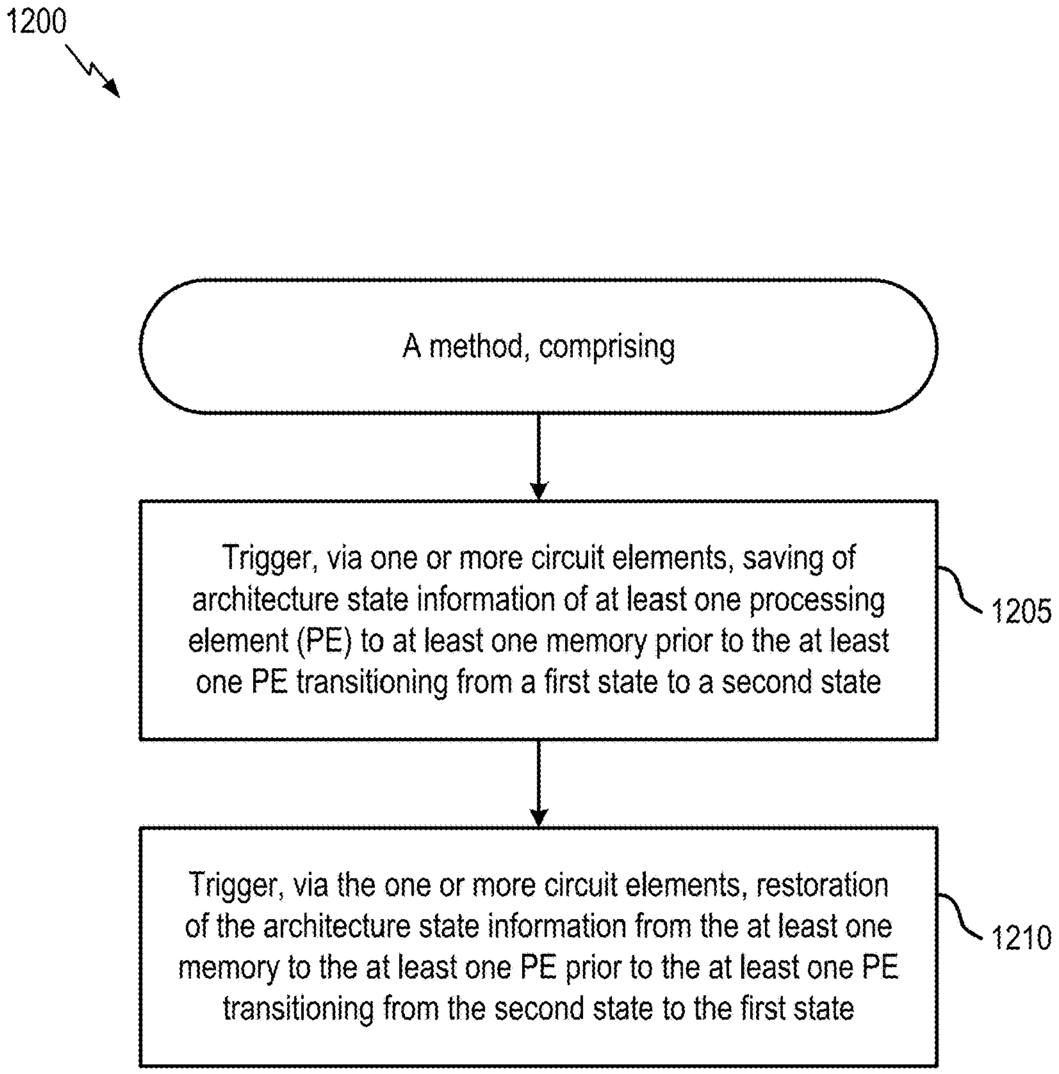
FIG. 12 depicts a method for wireless communications.

FIG. 12 shows an example of a method 1200.

Method 1200 begins at step 1205 with triggering, via one or more circuit elements, saving of architecture state information of at least one processing element (PE) to at least one memory prior to the at least one PE transitioning from a first state to a second state. In some cases, the operations of this step refer to, or may be performed by, circuitry for triggering and/or code for triggering as described with reference to FIG. 13.

Method 1200 then proceeds to step 1210 with triggering, via the one or more circuit elements, restoration of the architecture state information from the at least one memory to the at least one PE prior to the at least one PE transitioning from the second state to the first state. In some cases, the operations of this step refer to, or may be performed by, circuitry for triggering and/or code for triggering as described with reference to FIG. 13.

In some aspects, the at least one PE transitions from the first state to the second state as part of a power down sequence; and the at least one PE transitions from the second state to the first state as part of a power up sequence.

In some aspects, the one or more circuit elements comprise, at least one sequencing element to trigger the saving and restoration; and at least one routing interface to transfer architecture state information between state registers of the at least one PE and the at least one memory.

In some aspects, the at least one PE comprises multiple PEs; and the at least one sequencing element comprises: a sequencing element per each of the multiple PEs, or a single sequence element that saves architecture state information for the multiple PEs.

In some aspects, the at least one sequencing element is configurable to trigger or skip the saving and restoration of the architecture state information.

In some aspects, the routing interface allows external access to the architecture state information.

In some aspects, the at least one sequencing element is configured to signal the at least one routing interface to block access to the architecture state information while the at least one PE is in the second state.

In some aspects, the at least one memory comprises at least one architecture state random access memory (RAM); and the routing interface is configured to, while the at least one PE is in the second state, re-route external requests to access the state registers to the architecture state RAM.

In some aspects, the architecture state information comprises information associated with different hierarchical levels.

In some aspects, the at least one sequencing element comprises a sequencing element per hierarchical level at which architecture state information is saved.

In some aspects, the at least one sequencing element comprises a single sequencing element capable of saving architecture state information at different hierarchical levels.

In some aspects, the saving comprises: saving architecture state information associated with a first hierarchical level at a memory associated with a second hierarchical level.

Figure 13:
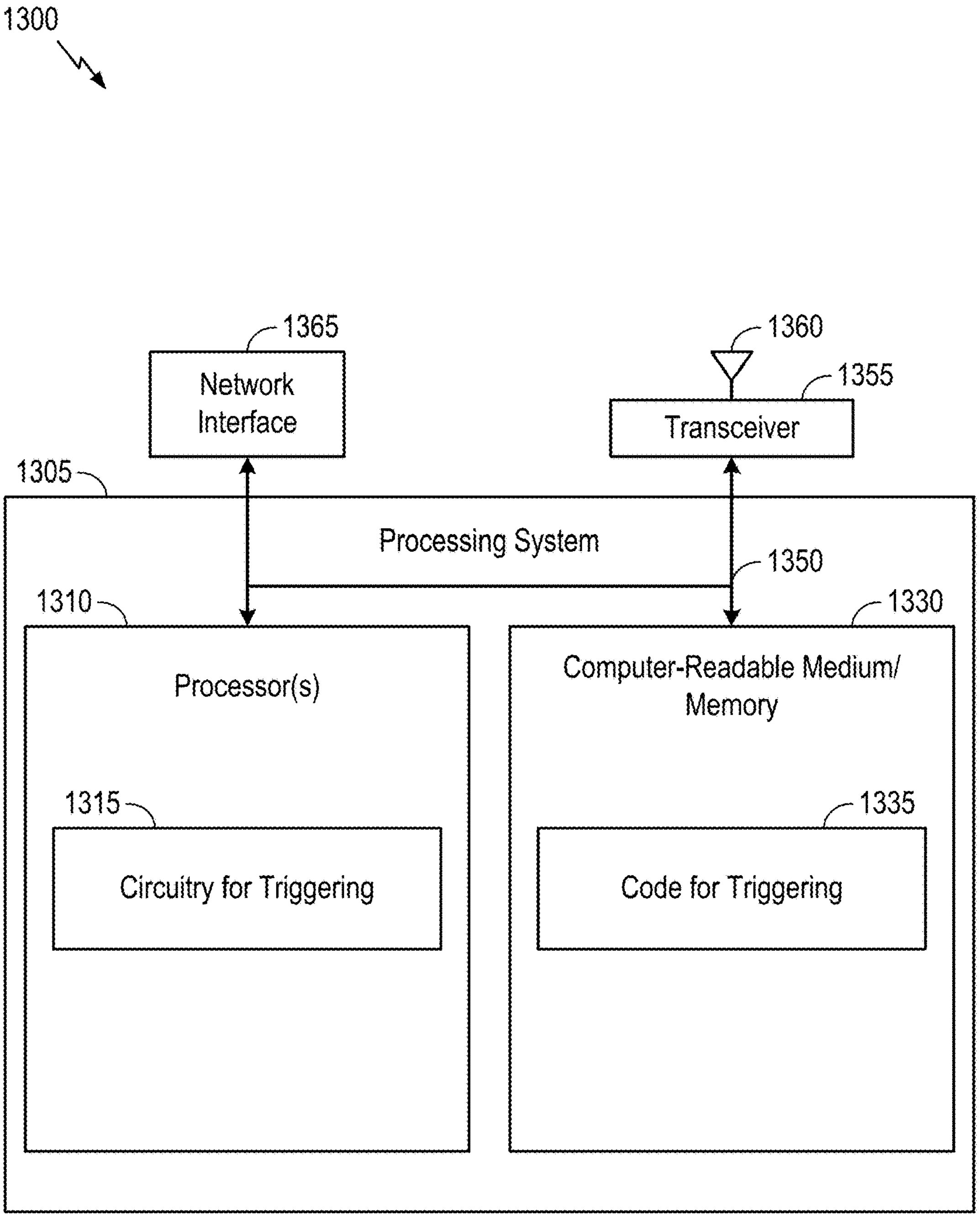
FIG. 13 depicts aspects of an example communications device.

In one aspect, method 1200, or any aspect related to it, may be performed by an apparatus, such as communications device 1300 of FIG. 13, which includes various components operable, configured, or adapted to perform the method 1200. Communications device 1300 is described below in further detail.

Note that FIG. 12 is just one example of a method, and other methods including fewer, additional, or alternative steps are possible consistent with this disclosure.

Example Communications Device(s)

FIG. 13 depicts aspects of an example communications device 1300.

The communications device 1300 includes a processing system 1305 coupled to the transceiver 1335 (e.g., a transmitter and/or a receiver) and/or a network interface 1345. The transceiver 1335 is configured to transmit and receive signals for the communications device 1300 via the antenna 1340, such as the various signals as described herein. The network interface 1345 is configured to obtain and send signals for the communications device 1300 via communication link(s), such as a backhaul link, midhaul link, and/or fronthaul link as described herein. The processing system 1305 may be configured to perform processing functions for the communications device 1300, including processing signals received and/or to be transmitted by the communications device 1300.

The processing system 1305 includes one or more processors 1310. The one or more processors 1310 are coupled to a computer-readable medium/memory 1320 via a bus 1330. In certain aspects, the computer-readable medium/memory 1320 is configured to store instructions (e.g., computer-executable code) that when executed by the one or more processors 1310, cause the one or more processors 1310 to perform the method 1200 described with respect to FIG. 12, or any aspect related to it. Note that reference to a processor of communications device 1300 performing a function may include one or more processors 1310 of communications device 1300 performing that function.

In the depicted example, the computer-readable medium/memory 1320 stores code (e.g., executable instructions), such as code for triggering 1325. Processing of the code for triggering 1325 may cause the communications device 1300 to perform the method 1200 described with respect to FIG. 12, or any aspect related to it.

The one or more processors 1310 include circuitry configured to implement (e.g., execute) the code stored in the computer-readable medium/memory 1320, including circuitry such as circuitry for triggering 1315. Processing with circuitry for triggering 1315 may cause the communications device 1300 to perform the method 1200 described with respect to FIG. 12, or any aspect related to it.

Various components of the communications device 1300 may provide means for performing the method 1200 described with respect to FIG. 12, or any aspect related to it. Means for transmitting, sending or outputting for transmission may include the transceiver 1335 and the antenna 1340 of the communications device 1300 in FIG. 13. Means for receiving or obtaining may include the transceiver 1335 and the antenna 1340 of the communications device 1300 in FIG. 13.

Example Clauses

Implementation examples are described in the following numbered clauses:

Clause 1: A method, comprising: triggering, via one or more circuit elements, saving of architecture state information of at least one processing element (PE) to at least one memory prior to the at least one PE transitioning from a first state to a second state; and triggering, via the one or more circuit elements, restoration of the architecture state information from the at least one memory to the at least one PE prior to the at least one PE transitioning from the second state to the first state.

Clause 2: The method of Clause 1, wherein: the at least one PE transitions from the first state to the second state as part of a power down sequence; and the at least one PE transitions from the second state to the first state as part of a power up sequence.

Clause 3: The method of any one of Clauses 1-2, wherein the one or more circuit elements comprise, at least one sequencing element to trigger the saving and restoration; and at least one routing interface to transfer architecture state information between state registers of the at least one PE and the at least one memory.

Clause 4: The method of Clause 3, wherein: the at least one PE comprises multiple PEs; and the at least one sequencing element comprises: a sequencing element per each of the multiple PEs, or a single sequence element that saves architecture state information for the multiple PEs.

Clause 5: The method of Clause 3, wherein the at least one sequencing element is configurable to trigger or skip the saving and restoration of the architecture state information.

Clause 6: The method of Clause 3, wherein the routing interface allows external access to the architecture state information.

Clause 7: The method of Clause 6, wherein the at least one sequencing element is configured to signal the at least one routing interface to block access to the architecture state information while the at least one PE is in the second state.

Clause 8: The method of Clause 6, wherein: the at least one memory comprises at least one architecture state random access memory (RAM); and the routing interface is configured to, while the at least one PE is in the second state, re-route external requests to access the state registers to the architecture state RAM.

Clause 9: The method of Clause 3, wherein the architecture state information comprises information associated with different hierarchical levels.

Clause 10: The method of Clause 9, wherein the at least one sequencing element comprises a sequencing element per hierarchical level at which architecture state information is saved.

Clause 11: The method of Clause 9, wherein the at least one sequencing element comprises a single sequencing element capable of saving architecture state information at different hierarchical levels.

Clause 12: The method of Clause 9, wherein the saving comprises: saving architecture state information associated with a first hierarchical level at a memory associated with a second hierarchical level.

Clause 13: An apparatus, comprising: at least one memory comprising executable instructions; and at least one processor configured to execute the executable instructions and cause the apparatus to perform a method in accordance with any combination of Clauses 1-12.

Clause 14: An apparatus, comprising means for performing a method in accordance with any combination of Clauses 1-12.

Clause 15: A non-transitory computer-readable medium comprising executable instructions that, when executed by at least one processor of an apparatus, cause the apparatus to perform a method in accordance with any combination of Clauses 1-12.

Clause 16: A computer program product embodied on a computer-readable storage medium comprising code for performing a method in accordance with any combination of Clauses 1-12.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a graphics processing unit (GPU), a neural processing unit (NPU), a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

In some cases, rather than actually transmitting a signal, an apparatus (e.g., a wireless node or device) may have an interface to output the signal for transmission. For example, a processor may output a signal, via a bus interface, to a radio frequency (RF) front end for transmission. Accordingly, a means for outputting may include such an interface as an alternative (or in addition) to a transmitter or transceiver. Similarly, rather than actually receiving a signal, an apparatus (e.g., a wireless node or device) may have an interface to obtain a signal from another device. For example, a processor may obtain (or receive) a signal, via a bus interface, from an RF front end for reception. Accordingly, a means for obtaining may include such an interface as an alternative (or in addition) to a receiver or transceiver.

While the present disclosure may describe certain operations as being performed by one type of wireless node, the same or similar operations may also be performed by another type of wireless node. For example, operations performed by a user equipment (UE) may also (or instead) be performed by a network entity (e.g., a base station or unit of a disaggregated base station). Similarly, operations performed by a network entity may also (or instead) be performed by a UE.

Further, while the present disclosure may describe certain types of communications between different types of wireless nodes (e.g., between a network entity and a UE), the same or similar types of communications may occur between same types of wireless nodes (e.g., between network entities or between UEs, in a peer-to-peer scenario). Further, communications may occur in reverse order than described.

Means for triggering may comprise one or more processors, such as one or more of the processors described above with reference to FIG. 13.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:

triggering, via one or more circuit elements, saving of architecture state information of at least one processing element (PE) to at least one memory prior to the at least one PE transitioning from a first state to a second state; and triggering, via the one or more circuit elements, restoration of the architecture state information from the at least one memory to the at least one PE prior to the at least one PE transitioning from the second state to the first state, wherein the one or more circuit elements comprise:

at least one sequencing element to trigger the saving and restoration; and at least one routing interface to transfer architecture state information between state registers of the at least one PE and the at least one memory, wherein the routing interface allows external access to the architecture state information, and wherein the at least one sequencing element is configured to signal the at least one routing interface to block access to the architecture state information while the at least one PE is in the second state.

2. The method of claim 1, wherein:

the at least one PE transitions from the first state to the second state as part of a power down sequence; and the at least one PE transitions from the second state to the first state as part of a power up sequence.

3. The method of claim 1, wherein:

the at least one PE comprises multiple PEs; and the at least one sequencing element comprises:

a sequencing element per each of the multiple PEs, or a single sequence element that saves architecture state information for the multiple PEs.

4. The method of claim 1, wherein the at least one sequencing element is configurable to trigger or skip the saving and restoration of the architecture state information.

5. The method of claim 1, wherein:

the at least one memory comprises at least one architecture state random access memory (RAM); and the routing interface is configured to, while the at least one PE is in the second state, re-route external requests to access the state registers to the architecture state RAM.

6. The method of claim 1, wherein the architecture state information comprises information associated with different hierarchical levels.

7. The method of claim 6, wherein the at least one sequencing element comprises a sequencing element per hierarchical level at which architecture state information is saved.

8. The method of claim 6, wherein the at least one sequencing element comprises a single sequencing element capable of saving architecture state information at different hierarchical levels.

9. The method of claim 6, wherein the saving comprises:

saving architecture state information associated with a first hierarchical level at a memory associated with a second hierarchical level.

10. An apparatus, comprising:

at least one memory; and one or more circuit elements configured to trigger saving of architecture state information of at least one processing element (PE) to the at least one memory prior to the at least one PE transitioning from a first state to a second state and to trigger restoration of the architecture state information from the at least one memory to the at least one PE prior to the at least one PE transitioning from the second state to the first state, wherein the one or more circuit elements comprise:

at least one sequencing element to trigger the saving and restoration; and at least one routing interface to transfer architecture state information between state registers of the at least one PE and the at least one memory, wherein the routing interface allows external access to the architecture state information, and wherein the at least one sequencing element is configured to signal the at least one routing interface to block access to the architecture state information while the at least one PE is in the second state.

11. The apparatus of claim 10, wherein:

the at least one PE transitions from the first state to the second state as part of a power down sequence; and the at least one PE transitions from the second state to the first state as part of a power up sequence.

12. The apparatus of claim 10, wherein:

the at least one PE comprises multiple PEs; and the at least one sequencing element comprises:

a sequencing element per each of the multiple PEs, or a single sequence element that saves architecture state information for the multiple PEs.

13. The apparatus of claim 10, wherein the at least one sequencing element is configurable to trigger or skip the saving and restoration of the architecture state information.

14. An apparatus, comprising:

means for triggering, via one or more circuit elements, saving of architecture state information of at least one processing element (PE) to at least one memory prior to the at least one PE transitioning from a first state to a second state; and means for triggering, via the one or more circuit elements, restoration of the architecture state information from the at least one memory to the at least one PE prior to the at least one PE transitioning from the second state to the first state, wherein the one or more circuit elements comprise:

at least one sequencing element to trigger the saving and restoration; and at least one routing interface to transfer architecture state information between state registers of the at least one PE and the at least one memory, wherein the routing interface allows external access to the architecture state information, and wherein the at least one sequencing element is configured to signal the at least one routing interface to block access to the architecture state information while the at least one PE is in the second state.

* * * * *